(12) United States Patent
Fujita (10) Patent No.: US 10,894,475 B2
(45) Date of Patent: Jan. 19, 2021

(54) DEVICE EQUIPPED WITH TANK

(71) Applicant: TOYOTA JIDOSHA KABUSHIKI KAISHA, Toyota (JP)

(72) Inventor: Keisuke Fujita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 16/115,054

(22) Filed: Aug. 28, 2018

(65) Prior Publication Data

US 2019/0084414 A1    Mar. 21, 2019

(30) Foreign Application Priority Data

Sep. 21, 2017   (JP) ................................. 2017-181744

(51) Int. Cl.
*B60K 15/07* (2006.01)
*B60L 50/53* (2019.01)
(Continued)

(52) U.S. Cl.
CPC ................ *B60K 15/07* (2013.01); *B60K 6/48* (2013.01); *B60L 50/53* (2019.02); *B62D 21/16* (2013.01);
(Continued)

(58) Field of Classification Search
CPC .... B60K 15/07; B60K 6/48; B60K 15/03006; B60K 2015/03019; B60K 2015/03361; B60K 2015/03368; B62D 21/16; B67D 7/42; B67D 7/0401; B67D 2007/0446; B67D 2007/0463; F17C 5/06; F17C 5/007; F17C 2227/0337; F17C 2250/0636; F17C 2223/036; F17C 2250/032;
(Continued)

(56) References Cited

U.S. PATENT DOCUMENTS 5,706,776 A * 1/1998 Luehring ............. B60K 15/035
                                                                123/198 D
6,321,692 B1 * 11/2001 Rayner .................. F02M 25/00
                                                                123/1 A
(Continued)

FOREIGN PATENT DOCUMENTS

JP      2003036870 A    2/2003
JP      2008038763 A    2/2008
(Continued)

*Primary Examiner* — Kevin Hurley
*Assistant Examiner* — Felicia L. Brittman
(74) *Attorney, Agent, or Firm* — Hunton Andrews Kurth LLP (57) ABSTRACT

A device equipped with a tank, includes: the tank to be filled with a fuel gas; a valve mechanism provided in the tank; a receptacle with which a nozzle of a fuel gas filling device is connectable; a first filling path, an upstream end of the first filling path communicating with the receptacle; a second filling path, a downstream end of the second filling path communicating with the tank through the valve mechanism; and a storage container hermetically communicating between a downstream end of the first filling path and an upstream end of the second filling path, and storing foreign matter contained in the fuel gas, wherein the storage container is positioned vertically above the downstream end of the first filling path.

10 Claims, 10 Drawing Sheets

(51) Int. Cl.
*F17C 5/06* (2006.01)
*B60K 6/48* (2007.10)
*B62D 21/16* (2006.01)
*B67D 7/04* (2010.01)
*B67D 7/42* (2010.01)
*F17C 5/00* (2006.01)
*B60K 15/03* (2006.01)

(52) U.S. Cl.
CPC ............ *B67D 7/0401* (2013.01); *B67D 7/42* (2013.01); *F17C 5/007* (2013.01); *F17C 5/06* (2013.01); *B60K 15/03006* (2013.01); *B60K 2015/03019* (2013.01); *B60K 2015/03203* (2013.01); *B60K 2015/03315* (2013.01); *B60K 2015/03361* (2013.01); *B60K 2015/03368* (2013.01); *B67D 2007/0446* (2013.01); *B67D 2007/0463* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0337* (2013.01); *F17C 2250/032* (2013.01); *F17C 2250/034* (2013.01); *F17C 2250/043* (2013.01); *F17C 2250/0439* (2013.01); *F17C 2250/0443* (2013.01); *F17C 2250/0636* (2013.01); *F17C 2250/0642* (2013.01); *F17C 2260/056* (2013.01); *F17C 2265/015* (2013.01); *F17C 2265/065* (2013.01); *F17C 2270/0139* (2013.01); *F17C 2270/0168* (2013.01)

(58) Field of Classification Search
CPC ...... F17C 2250/0443; F17C 2270/0168; F17C 2265/065; F17C 2223/0123; F17C 2260/056; F17C 2270/0139; F17C 2250/034; F17C 2250/043; F17C 2265/015; F17C 2250/0439; F17C 2221/012; F17C 2225/036; F17C 2250/0642; F17C 2225/0123
USPC ........................................................ 280/834
See application file for complete search history.

(56) References Cited

U.S. PATENT DOCUMENTS

8,360,091 B2 * 1/2013 Revink ............ B60K 15/03519
 137/265
2012/0103796 A1 5/2012 Taruya et al.

FOREIGN PATENT DOCUMENTS

| JP | 2008163810 A | | 7/2008 |
| JP | 2010019334 A | | 1/2010 |
| JP | 2010023550 A | | 2/2010 |
| JP | 2010242952 A | | 10/2010 |
| JP | 2011047491 A | * | 3/2011 |
| JP | 2011047491 A | | 3/2011 |
| JP | 2011149541 A | | 8/2011 |
| JP | 2012092402 A | | 5/2012 |

* cited by examiner

DEVICE EQUIPPED WITH TANK

CROSS-REFERENCE TO RELATED APPLICATION

This application is based upon and claims the benefit of priority of the prior Japanese Patent Application No. 2017-181744, filed on Sep. 21, 2017, the entire contents of which are incorporated herein by reference.

FIELD OF THE INVENTION

The present invention relates to a device equipped with a tank.

BACKGROUND

In a device equipped with a tank, the tank is filled with a fuel gas from a fuel gas filling device. There is known a fuel gas filling device with a container separating moisture from the fuel gas (see, for example, Japanese Unexamined Patent Application Publication No. 2011-149541).

To fill the tank with the fuel gas, a nozzle of the fuel gas filling device and a receptacle of the device equipped with the tank are connected with each other, and the fuel gas is filled into the tank through a filling path communicating between the receptacle and the tank. Herein, foreign matter such as water and dust may often adhere to the nozzle and the receptacle. In this case, when the nozzle and the receptacle are connected with each other and the fuel gas is filled into the tank, the foreign matter having been adhered to the nozzle or the receptacle might move together with the fuel gas through the filling path, and then the foreign matter might adhere to a valve mechanism of the tank. For example, if dust adheres to the valve mechanism or if water adheres thereto and freezes, the valve mechanism might malfunction. Depending on the configuration of the valve mechanism, the foreign matter having been adhered to the valve mechanism might be introduced into the tank or might move together with the fuel gas to the fuel cell.

SUMMARY OF THE INVENTION

It is an object of the present invention to provide a device equipped with a tank suppressing foreign matter from adhering to a valve mechanism provided in the tank.

The above object is achieved by a device equipped with a tank, including: the tank to be filled with a fuel gas; a valve mechanism provided in the tank; a receptacle with which a nozzle of a fuel gas filling device is connectable; a first filling path, an upstream end of the first filling path communicating with the receptacle; a second filling path, a downstream end of the second filling path communicating with the tank through the valve mechanism; and a storage container hermetically communicating between a downstream end of the first filling path and an upstream end of the second filling path, and storing foreign matter contained in the fuel gas, wherein the storage container is positioned vertically above the downstream end of the first filling path. With the above configuration, the fuel gas is filled into the tank through the storage container, so that the foreign matter is stored in the storage container without reaching the valve mechanism. Further, the upstream end of the second filling path is positioned vertically above the downstream end of the first filling path, so that the foreign matter stored in the storage container is spaced away from the upstream end of the second filling path, which suppresses the foreign matter from adhering to the upstream end of the second filling path and from reaching the valve mechanism. Therefore, the foreign matter is suppressed from adhering to the valve mechanism.

A discharge mechanism discharging the foreign matter stored in the storage container to an outside may be included.

A length of the first filling path may be smaller than that of the second filling path.

A direction of an axis of an opening of the downstream end of the first filling path may intersect a vertical direction, and an angle, of a vertically upper side, between the direction of the axis of the opening of the downstream end of the first filling path and an inner surface of a wall portion of the storage container intersecting the axis may be equal to or greater than 90 degrees and smaller than 180 degrees.

An opening of the upstream end of the second filling path may be directed in a horizontal direction or in a vertically upward direction with respect to the horizontal direction.

The storage container may include a blocking wall portion, and the blocking wall portion may protrude inward from an inner side surface of the storage container, may be positioned vertically above a portion positioned in a most vertically lower side of the storage container, and may be positioned vertically below the upstream end of the second filling path.

A bypass path bypassing the storage container and communicating with the first and second filling paths, a switching mechanism switching a communication state where the first and second filling paths communicate with each other through the storage container and not through the bypass path, and a bypass state where the first and second filling paths communicate with each other through the bypass path and not through the storage container, and a switching controller configured to control the switching mechanism to be in the communication state until a predetermined period elapses from when the fuel gas starts being filled into the tank, and configured to control the switching mechanism to be in the bypass state until filling of the fuel gas is completed after the predetermined period elapses may be included.

The switching mechanism may be a three-way valve provided between the first or the second filling path and the bypass path.

The discharge mechanism may include: a discharge path communicating with the storage container; and an electrically controlled valve opening and closing the discharge path, and a determinator configured to determine whether or not an internal pressure of at least one of the first filling path, the second filling path, and the storage container is lower than a predetermined value; and a discharge controller configured to temporarily open the electrically controlled valve when it is determined that the internal pressure is lower than the predetermined value may be included.

A pressure sensor detecting the internal pressure may be included, wherein the determinator may be configured to determine whether or not the internal pressure is lower than the predetermined value on a basis of a detection value of the pressure sensor.

DETAILED DESCRIPTION

Figure 1:
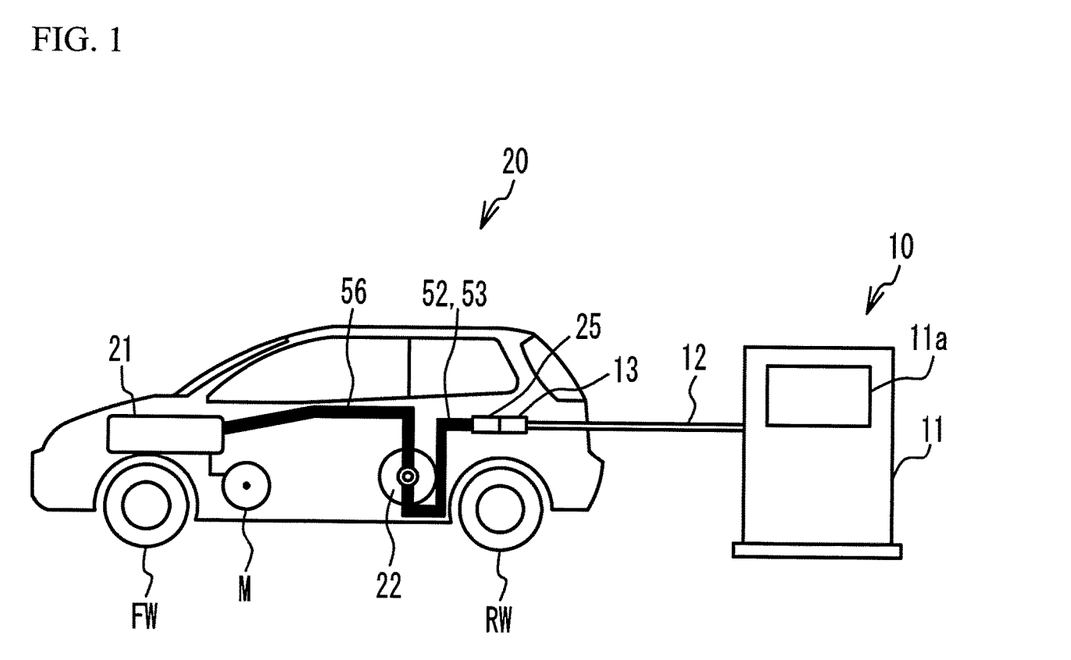
FIG. 1 is an explanatory view of a gas filling system.
Figure 2:
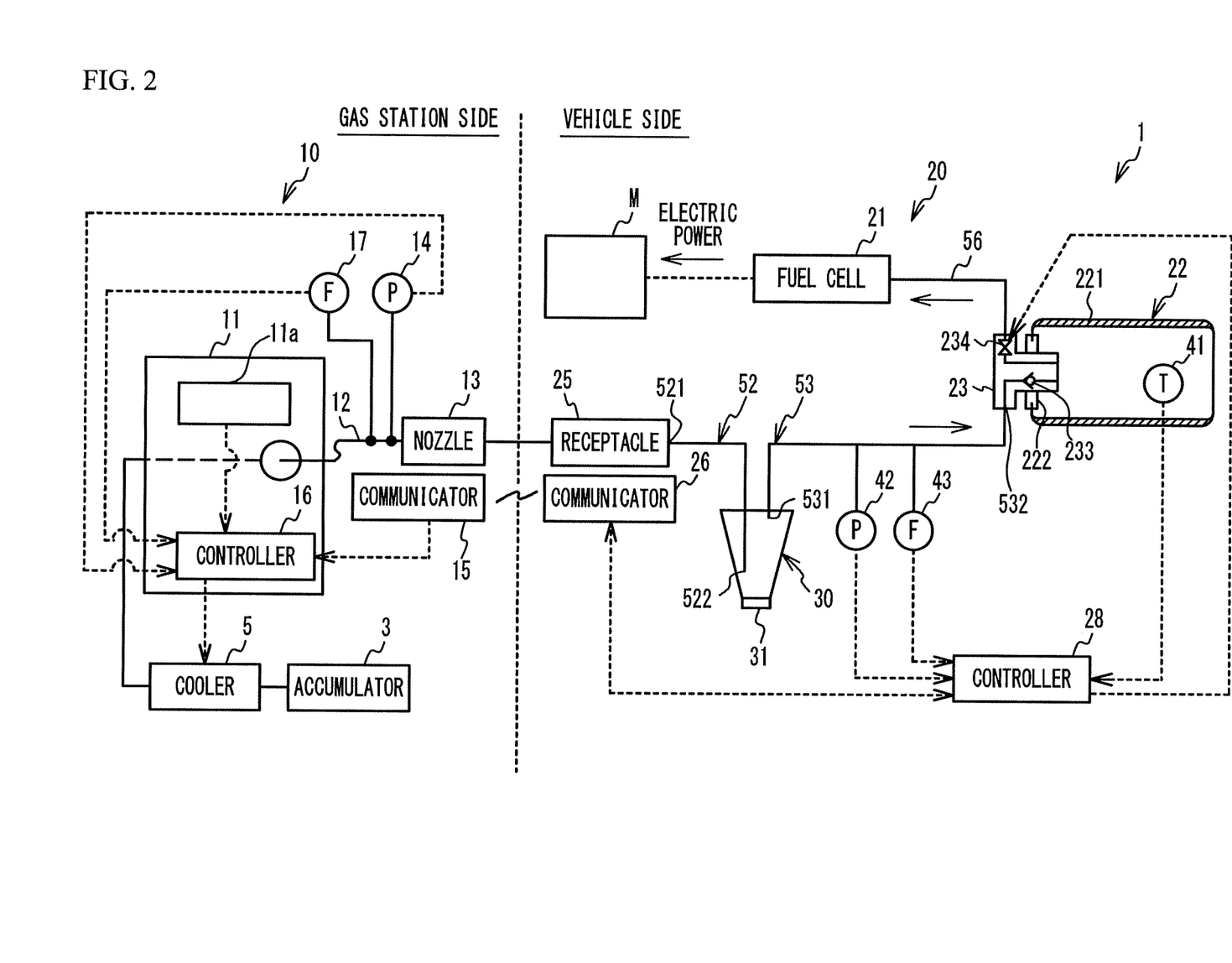
FIG. 2 is an explanatory view of a gas station and a vehicle.

FIG. 1 is an explanatory view of a gas filling system 1 (hereinafter simply referred to as a system 1). The system 1 includes: a vehicle 20 driven by electric power generated in a fuel cell 21 that generates electric power and uses a fuel gas; and a gas station 10 filling a tank 22 of the vehicle 20 with a fuel gas. Hydrogen gas is used as the fuel gas. FIG. 2 is an explanatory view of the gas station 10 and the vehicle 20.

Firstly, the gas station 10 will be described. The gas station 10 includes a pressure accumulator 3, a cooler 5, a dispenser 11, a filling hose 12, a nozzle 13, a pressure sensor 14, a communicator 15, a controller 16, and a flow rate sensor 17. The accumulator 3 stores a hydrogen gas that is pressurized to a predetermined pressure by a compressor and is supplied from a hydrogen curdle not illustrated. The cooler 5 precools the hydrogen gas supplied from the accumulator 3. The dispenser 11 feeds the hydrogen gas from the cooler 5 to the filling hose 12 connected with the dispenser 11. The dispenser 11 is provided with an operation panel 11a for receving setting of a desired target filling amount of the hydrogen gas to be filled in the tank 22 of the vehicle 20 by a user. The nozzle 13 is attached to an end of the filling hose 12. The pressure sensor 14 and the flow rate sensor 17 are provided near the nozzle 13, and respectively detect the pressure and the flow rate of the hydrogen gas passing through the nozzle 13. The pressure sensor 14 and the flow rate sensor 17 may be provided within the dispenser 11 so long as the pressure sensor 14 and the flow rate sensor 17 respectively detect the pressure and the flow rate within a path between the dispenser 11 and the nozzle 13. The communicator 15 will be described later. The controller 16 is a microcomputer including a Central Processing Unit (CPU), a Read Only Memory (ROM), a Random Access Memory (RAM), and a memory. The controller 16 is electrically connected with the cooler 5, the pressure sensor 14, the communicator 15, and the flow rate sensor 17, and controls the entire operation of the gas station 10.

Next, the vehicle 20 will be described. The vehicle 20 includes the fuel cell 21, the tank 22, a receptacle 25, a communicator 26, a controller 28, a storage container 30, a temperature sensor 41, a pressure sensor 42, a flow rate sensor 43, a first filling path 52, a second filling path 53, a supply path 56, a motor M, front wheels FW, and rear wheels RW. The fuel cell 21 generates electric power on the basis of a supplied oxidant gas and a hydrogen gas supplied from the tank 22. The tank 22 can be filled with a high-pressure hydrogen gas. The first filling path 52 and the second filling path 53 lead the hydrogen gas supplied from the gas station 10 to the tank 22. The second filling path 53 is positioned downstream from the first filling path 52. As for the first filling path 52, an upstream end 521 communicates with the receptacle 25, and a downstream end 522 communicates with the storage container 30. As for the second filling path 53, an upstream end 531 communicates with the storage container 30, and a downstream end 532 communicates with a valve mechanism 23 of the tank 22 described later. The storage container 30 will be described later. The supply path 56 communicates with the valve mechanism 23 of the tank 22, and supplies the hydrogen gas from the tank 22 to the fuel cell 21. The receptacle 25 communicates with the upstream end 521 of the first filling path 52 as described above, and is a portion with which the nozzle 13 is connected at the time when the hydrogen gas is filled into the tank 22. The receptacle 25 is provided in, for example, a lid box of the vehicle 20. The communicator 26 and the controller 28 will be described later. The motor M, for driving the vehicle 20, is driven by the electric power supplied from the fuel cell 21, and the driving force of the motor M transmitted to at least one pair of the front wheels FW and the rear wheels RW. The temperature sensor 41 detects a gas temperature which is the temperature of the hydrogen gas within the tank 22. The pressure sensor 42 and the flow rate sensor 43 are provided in the second filling path 53, and respectively detect the pressure and the flow rate of the hydrogen gas passing through the second filling path 53. At least one of the pressure sensor 42 and the flow rate sensor 43 may be provided in the first filling path 52 or in the storage container 30. Moreover, in a case of providing at least one of the pressure sensor 42 and the flow rate sensor 43 in the storage container 30, it is desirably provided in the storage container 30 at a position to which foreign matter described later and stored in the storage container 30 is unlikely to adhere.

The tank 22 includes a main body 221, a cap 222 attached to an end of the main body 221 in its longitudinal direction, and the valve mechanism 23 provided at an opening of the cap 222. The valve mechanism 23 switches between a state where the tank 22 is filled with the hydrogen gas and a state where the hydrogen gas is released from the tank 22 to the fuel cell 21. Specifically, the valve mechanism 23 includes a check valve 233 and an opening-closing valve 234. The valve mechanism 23 is provided with a path communicating between the downstream end 532 of the second filling path 53 and the inside of the tank 22, and the check valve 233 is provided on this path. The check valve 233 allows the hydrogen gas to flow from the second filling path 53 to the tank 22 but prevents the hydrogen gas from flowing from the tank 22 to the second filling path 53. Further, the valve mechanism 23 is provided with a path communicating between the inside of the tank 22 and the supply path 56, and the opening-closing valve 234 is provided on this path. In response to opening and closing of the opening-closing valve 234, the hydrogen gas accumulated in the tank 22 at a high pressure is supplied to the fuel cell 21 through the supply path 56. A temperature in the tank 22 is detected by the temperature sensor 41.

The controller 28 is a microcomputer including a CPU, a ROM, a RAM, and a memory, and controls the entire operation of the vehicle 20 on the basis of inputted sensor signals. The controller 28 is electrically connected with the communicator 26, the temperature sensor 41, the pressure sensor 42, the flow rate sensor 43, and the opening-closing valve 234.

The controller 16 of the gas station 10 and the controller 28 of the vehicle 20 are capable of communicating predetermined information via the communicators 15 and 26. The communicators 15 and 26 are capable of achieving mutual radio communication such as infrared communication. The controller 16 obtains information such as a pressure and a gas temperature in the tank 22 from the controller 28 of the vehicle 20 via the communicators 15 and 26. Further, the controller 16 may obtain information such as a fillable amount of the tank 22 and an allowable pressure of the tank 22. The controller 16 controls each device in the gas station 10, on the basis of such information obtained from the vehicle 20 and information such as a target filling amount of the hydrogen gas received from the operation panel 11a of the dispenser 11, and controls a filling rate and a filling amount of the hydrogen gas to the vehicle 20. The communicators 15 and 26 are respectively provided near the nozzle 13 and the receptacle 25, so that the communication is achieved with the nozzle 13 and the receptacle 25 connected with each other.

Next, the gas station 10 will be described in detail. The gas station 10 is an example of a fuel gas filling device that reduces the filling speed of the hydrogen gas into the tank 22 before the filling amount of the hydrogen gas in the tank 22 reaches the target filling amount, and that completes the filling of the hydrogen gas into the tank 22. Specifically, the controller 16 of the gas station 10 further reduces stepwise or continuously the flow rate of the hydrogen gas from the dispenser 11 to the tank 22 as an actual filling amount in the tank 22 from when the filling starts is closer to the target filling amount.

Figure 3A:
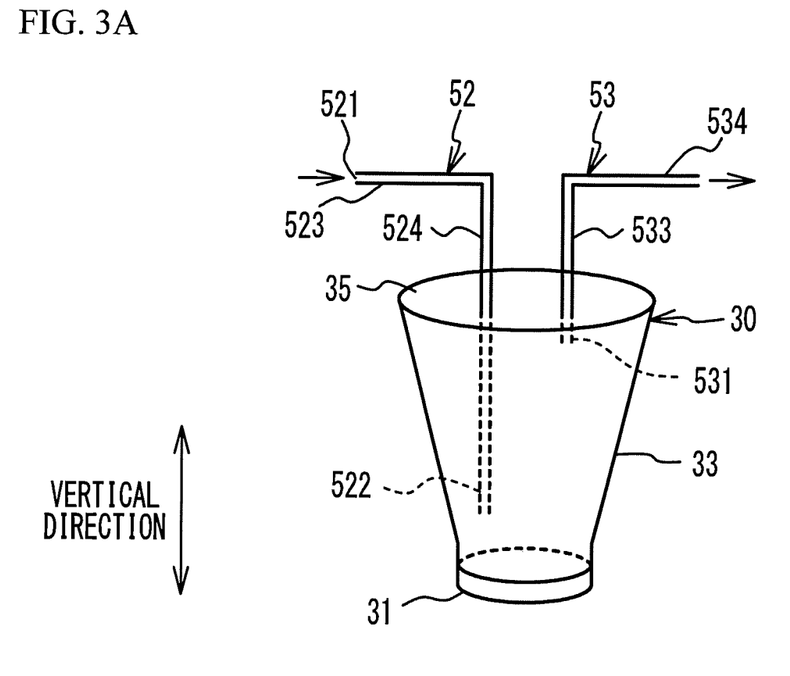
FIG. 3A is an external perspective view of a storage container.
Figure 3B:
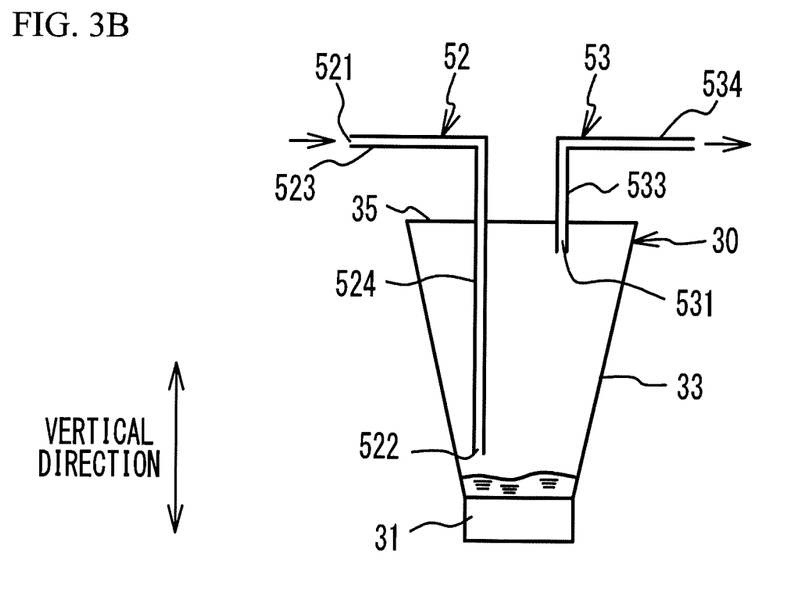
FIG. 3B is a view illustrating an internal structure of the storage container.

Next, the storage container 30 will be described. FIG. 3A is an external perspective view of the storage container 30. FIG. 3B is a view illustrating an internal structure of the storage container 30. The storage container 30 includes a bottom wall portion 31, a side wall portion 33, and an upper wall portion 35. The side wall portion 33 has a tapered shape such that its inner diameter gradually decreases from the upper wall portion 35 to the bottom wall portion 31, but is not limited thereto. In the storage container 30, the bottom wall portion 31 is positioned vertically below the side wall portion 33 and the upper wall portion 35. The first filling path 52 includes: a horizontal portion 523 extending substantially horizontally from the upstream end 521; and a vertical portion 524 continuously extending downstream from the horizontal portion 523 in the substantially vertically downward direction. Likewise, the second filling path 53 includes: a vertical portion 533 extending substantially vertically upwardly from the upstream end 531; and a horizontal portion 534 continuously extending downstream from the vertical portion 533 in the substantially horizontal direction. The vertical portion 524 and the vertical portion 533 penetrate through respective holes formed in the upper wall portion 35. A gap between the vertical portion 524 and the hole through which the vertical portion 524 penetrates is hermetically sealed by a sealing member such as an O ring. Likewise, a gap between the vertical portion 533 and the hole through which the vertical portion 533 penetrates is hermetically sealed. The bottom wall portion 31 is attached so as to hermetically seal an opening of a lower side of the side wall portion 33. Therefore, the first filling path 52 and the second filling path 53 hermetically communicate with the storage container 30. Additionally, the bottom wall portion 31 is threadedly engaged with a lower end of the side wall portion 33, and the bottom wall portion 31 is detachable from the side wall portion 33 by rotating the bottom wall portion 31. Further, the configuration is not limited to the above configuration as long as the bottom wall portion 31 is capable of opening and closing the side wall portion 33. For example, a hinge mechanism may connect the bottom wall portion 31 with the side wall portion 33 so as to open and close the side wall portion 33. Furthermore, the gap between the vertical portion 524 and the hole through which the vertical portion 524 penetrates, and the gap between the vertical portion 533 and the hole through which the vertical portion 533 penetrates, may be hermetically sealed by, for example, welding or the like.

In filling the tank 22 with the hydrogen gas, the hydrogen gas is temporarily discharged from the downstream end 522 of the first filling path 52 into the storage container 30, and then the hydrogen gas is introduced into the upstream end 531 of the second filling path 53 within the storage container 30, which fills the tank 22 with the hydrogen gas. Herein, in filling the tank 22 with the hydrogen gas as described above, the nozzle 13 and the receptacle 25 are connected with each other. Since opening end surfaces of the nozzle 13 and the receptacle 25 are exposed to the outside air, foreign matter such as water and dust may often adhere thereto. When the hydrogen gas has been filled in such a case, foreign matter moves together with the hydrogen gas through the first filling path 52. Since the downstream end 522 and the upstream end 531 are spaced away from each other, the foreign matter is discharged from the downstream end 522 and then is stored on the upper surface of the bottom wall portion 31 within the storage container 30. Therefore, the foreign matter is suppressed from entering the second filling path 53 from the upstream end 531 and from adhering to the valve mechanism 23 of the tank 22. Further, specific gravity of foreign matter such as moisture is greater than that of the fuel gas. Therefore, the foreign matter discharged from the downstream end 522 of the first filling path 52 into the storage container 30 is stored near the bottom wall portion 31, and only the fuel gas exists around the upstream end 531 of the second filling path 53 within the storage container 30. Thus, only the fuel gas within the storage container 30 is introduced into the upstream end 531 of the second filling path 53, and the fuel gas from which the foreign matter removed flows into the tank 22. Further, the foreign matter stored in the storage container 30 can be discharged outside by detaching the bottom wall portion 31 from the side wall portion 33. The bottom wall portion 31 is an example of a discharge mechanism discharging foreign matter stored in the storage container 30 to the outside.

Herein, although the downstream end 522 of the first filling path 52 and the upstream end 531 of the second filling path 53 face the bottom wall portion 31, the upstream end 531 is vertically spaced away from the bottom wall portion 31 as compared with the downstream end 522. Specifically, the downstream end 522 is positioned closer to the bottom wall portion 31 than the upper wall portion 35, and the upstream end 531 is positioned closer to the upper wall portion 35 than the bottom wall portion 31. Therefore, even when foreign matter stored on the upper surface of the bottom wall portion 31 is blown away by, for example, the flowing hydrogen gas within the storage container 30, the foreign matter is suppressed from entering the second filling path 53 from the upstream end 531. Further, the downstream end 522 and the upstream end 531 are spaced away from each other in the vertical direction and in the horizontal direction. Therefore, for example, the foreign matter discharged from the downstream end 522 is suppressed from adhering to the upstream end 531.

Although foreign matter stored in the storage container 30 can be discharged to the outside by detaching the bottom wall portion 31 from the side wall portion 33 as described above, maintenance is needed before the foreign matter in the storage container 30 covers the downstream end 522. Herein, the inner diameter of the side wall portion 33 is formed to be at least greater than each inner diameter of the first filling path 52 and the second filling path 53 inside the storage container 30. This ensures that an internal volume of a space positioned vertically below the downstream end 522 of the first filling path 52 within the storage container 30. It is therefore possible to store more foreign matter in the storage container 30 without covering the downstream end 522 of the first filling path 52, and to reduce a maintenance frequency.

A length of the first filling path 52 is smaller than a length of the second filling path 53. In other words, the storage container 30 is provided in such a position as to establish such a relationship between the lengths. For example, unlike the present embodiment, in a case where the length of the first filling path 52 is greater than that of the second filling path 53, the following problems might occur. The hydrogen gas precooled by the cooler is filled into the tank 22. Immediately after starting filling the fuel gas, an uncooled hydrogen gas remaining in the downstream side from the cooler 5 is initially filled into the tank 22. Therefore, immediately after starting filling the exhaust gas, the temperature within the first filling path 52 is relatively high. After a given period elapses, the hydrogen gas passing through the cooler 5 flows into the first filling path 52, and then the temperature in the first filling path 52 falls below freezing temperature. In this case, for example, when water enters the first filling path 52, the hydrogen gas passing through the cooler 5 and cooled thereby might enter the first filling path before the water is discharged from the downstream end 522. Thus, the water might freeze within the first filling path 52, and which might increase the pressure loss of the hydrogen gas flowing through the first filling path 52. In the present embodiment, the length of the first filling path 52 is smaller than the length of the second filling path 53 as described above, so that the water entering the first filling path 52 can be early stored in the storage container 30, which suppresses the water from freezing in the first filling path 52 as described above. In consideration of the above point, the length of the first filling path 52 is preferably small.

Figure 4A:
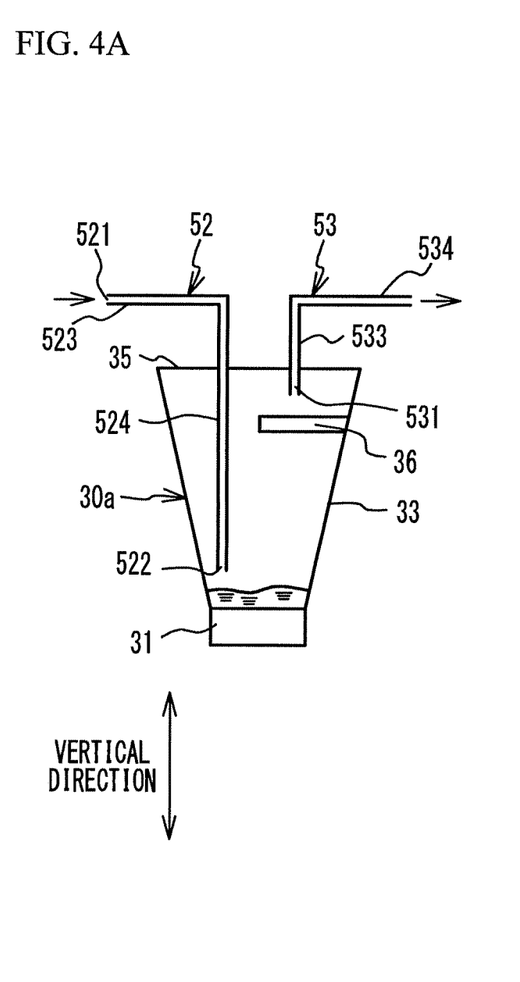
FIGS. 4A to 4C are explanatory views of storage containers according to variations.
Figure 4B:
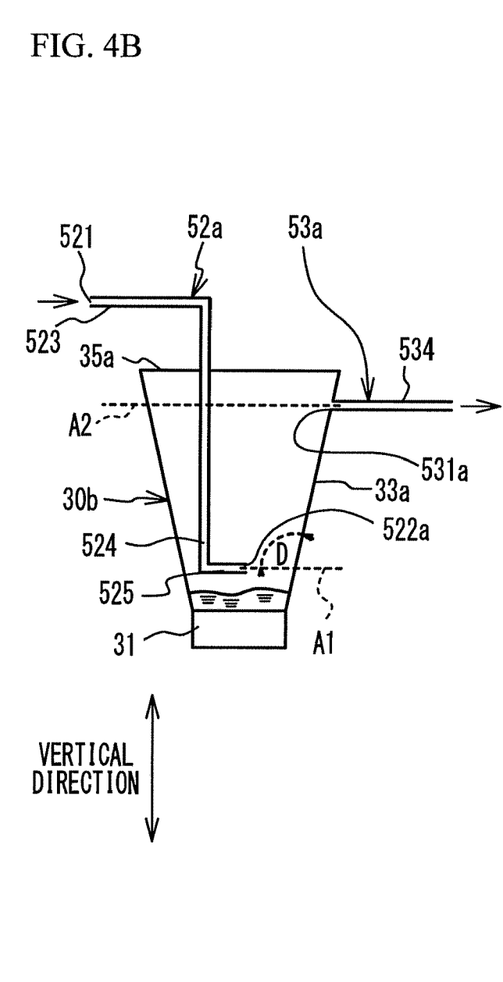
Figure 4C:
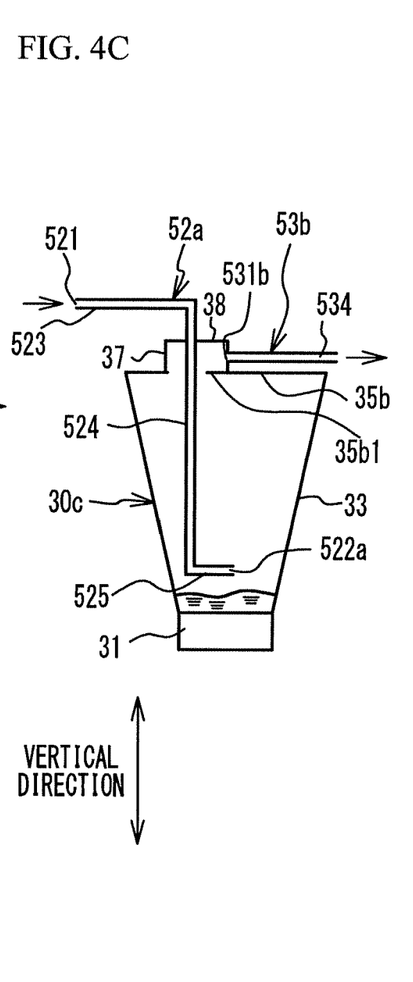

Next, a plurality of variations will be described. In description of the variations, the same components are denoted by the same reference numerals, and a duplicated description is omitted. FIGS. 4A to 4C are explanatory views of storage containers 30a, 30b, and 30c according to the variations, respectively. FIGS. 4A to 4C correspond to FIG. 3B. Firstly, the storage container 30a will be described. Within the storage container 30a, a blocking wall portion 36 is provided to face the upstream end 531 with a predetermined distance therefrom. The blocking wall portion 36 protrudes inwardly from the inner side surface of the side wall portion 33 of the storage container 30a, is positioned vertically above the inner surface of the bottom wall portion 31 positioned in the most vertically lower side within the storage container 30a, and is positioned vertically below the upstream end 531 of the second filling path 53. Therefore, since the blocking wall portion 36 is positioned between the upstream end 531 and the bottom wall portion 31, even when the hydrogen gas discharged from the downstream end 522 blows away foreign matter stored on the upper surface of the bottom wall portion 31, the foreign matter adheres to the blocking wall portion 36 but is suppressed from adhering to the inner side of the upstream end 531. Accordingly, the foreign matter is suppressed from entering the second filling path 53 from the upstream end 531. Additionally, the blocking wall portion 36 is provided at a position horizontally spaced away from the vertical portion 524 of the first filling path 52 so as not to contact therewith. The blocking wall portion 36 has a thin plate shape. The shape, the size, and the material of the blocking wall portion 36 are not limited, but the blocking wall portion is preferably small in order to suppress an increase in the pressure loss of the hydrogen gas.

Next, the storage container 30b will be described. As for the storage container 30b, an upper wall portion 35a is provided with a hole through which only a first filling path 52a penetrates, and a side wall portion 33a is provided with a hole with which a second filling path 53a communicates. In addition to the vertical portion 524, the first filling path 52a includes a horizontal portion 525 extending downstream and continuously from the vertical portion 524 in the substantially horizontal direction. An end of the horizontal portion 525 is a downstream end 522a. FIG. 4B illustrates an axis A1 of an opening of the downstream end 522a. The direction of the axis A1 extends in the substantially horizontal direction, in other words, intersects the vertical direction. An angle D, of the vertical upper side, between the direction of the axis A1 and the inner surface of the side wall portion 33a of the storage container 30b intersecting the axis A1 is equal to or greater than 90 degrees and smaller than 180 degrees. Therefore, most of the hydrogen gas discharged from the downstream end 522a is suppressed from flowing vertically downwardly along the inner surface of the side wall portion 33a, that is, from flowing toward the foreign matter stored on the upper surface of the bottom wall portion 31. Therefore, the foreign matter in the storage container 30 is suppressed from being blown away, and the foreign matter is suppressed from entering the second filling path 53 from an upstream end 531a. Further, the axis A1 does not intersect the bottom wall portion 31 but the side wall portion 33a, in other words, the downstream end 522a does not face the bottom wall portion 31 but the side wall portion 33a. Thus, the hydrogen gas discharged from the downstream end 522a is suppressed from directly blowing to the foreign matter. In the present variation, the direction of the axis A1 is not limited to the horizontal direction, but may be any that intersects the vertical direction. The angle D is not limited to the angle illustrated in FIG. 4B. Further, the inner surface of the wall portion intersecting the axis A1 may be, for example, the inner surface of the bottom wall portion inclined with respect to the horizontal direction.

Unlike the above-described embodiment and variation, the second filling path 53a does not include the vertical portion 533 extending vertically, and the horizontal portion 534 extending substantially horizontally is hermetically connected with the side wall portion 33a Therefore, an end of the horizontal portion 534 is the upstream end 531a. In FIG. 4B illustrates an axis A2 of the opening of the upstream end 531a. An opening of the upstream end 531a is directed horizontally, and the axis A2 is parallel to the horizontal direction. Therefore, even when the foreign matter stored on the upper surface of the bottom wall portion 31 is blown away within the storage container 30 by, for example, vibration applied to the vehicle 20, the foreign matter is suppressed from adhering to the inside of the upstream end 531a. Additionally, the axis A2 does not intersect the bottom wall portion 31 but the side wall portion 33a. In other words, the upstream end 531a does not face the bottom wall portion 31 but the side wall portion 33a. The opening of the upstream end 531a may be directed horizontally or vertically upwardly with respect to the horizontal direction. Also in this case, the foreign matter is further suppressed from adhering to the inside of the upstream end 531a.

Next, a storage container 30c will be described. An opening is formed in an upper wall portion 35b of the storage container 30c. An upper side wall 37 having a substantially cylindrical shape is formed around the opening. An upper protruding wall portion 38 closing an upper opening of the upper side wall 37 is formed. A space surrounded by the upper side wall 37 and a space surrounded by the side wall portion 33 communicate with each other. The upper protruding wall portion 38 is hermetically connected with the vertical portion 524 of the first filling path 52a. A horizontal size of the upper side wall 37 is smaller than that of the side wall portion 33. The side surface of the upper side wall 37 is connected with the horizontal portion 534 of a second filling path 53b, that is, is hermetically connected with a upstream end 531b. In addition, the upper wall portion 35b includes a protruding portion 35b1 protruding inwardly from the inner surface of the upper side wall 37 and positioned vertically below the upstream end 531b. Thus, the protruding portion 35b1 which is a part of the upper wall portion 35b functions in the same manner as the blocking wall portion 36 described above, and suppresses foreign matter from adhering to the upstream end 531b.

Instead of the first filling path 52 illustrated in FIGS. 3A, 3B, and 4A, the first filling path 52a illustrated in FIGS. 4B and 4C may be used. The blocking wall portion 36 illustrated in FIG. 4A may be provided in the storage containers 30b and 30c respectively illustrated in FIGS. 4B and 4C. Instead of the second filling path 53 illustrated in FIGS. 3A and 3B, the second filling path 53a illustrated in FIG. 4B may be used. Instead of the upper wall portion 35 and the second filling path 53 illustrated in FIGS. 3A, 3B, and 4A, the upper wall portion 35b, the upper side wall 37, the upper protruding wall portion 38, and the second filling path 53b may be used.

In the embodiment and the variations described above, the storage container is arranged such that the bottom wall portion is parallel to the horizontal plane, but the present invention is not limited thereto. That is, the bottom wall portion may be arranged so as to be inclined within an angular range of 45 degrees with respect to the horizontal plane. Further, the bottom wall portion may have a curved shape so as to be recessed vertically upwardly.

Figure 5:
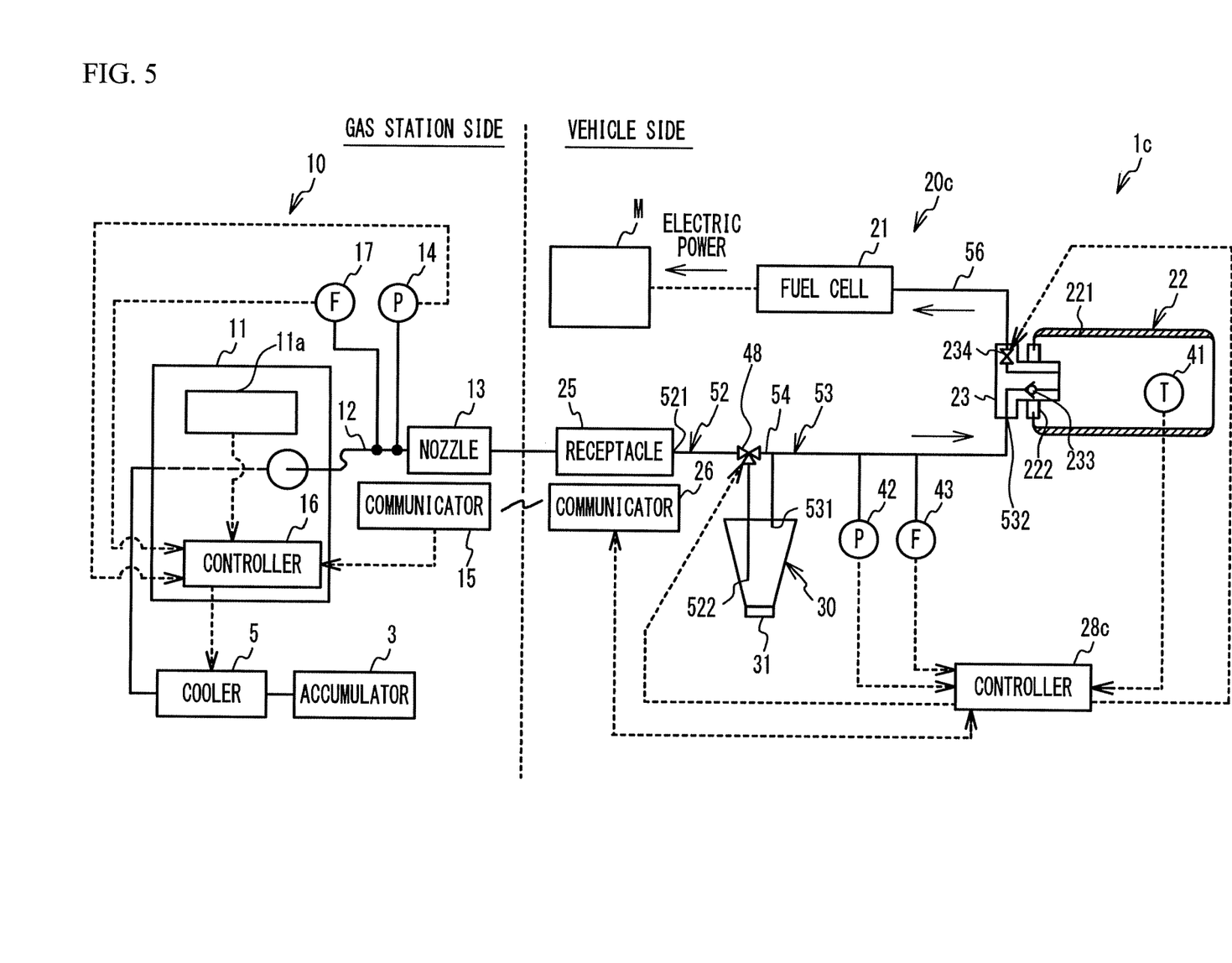
FIG. 5 is an explanatory view of a system according to a variation.

Next, a system 1c according to a variation will be described. FIG. 5 is an explanatory view of the system 1c according to a variation. A vehicle 20c includes a three-way valve 48 and a bypass path 54. The bypass path 54 bypasses the storage container 30 and communicates between the first filling path 52 and the second filling path 53. Specifically, the bypass path 54 communicates with a partway of the first filling path 52 and a partway of the second filling path 53. The three-way valve 48 is provided between the first filling path 52 and the bypass path 54. The three-way valve 48 is electrically connected with and controlled by a controller 28c. The three-way valve 48 switches between a state where an upstream portion of the first filling path 52 from the three-way valve 48 communicates with a downstream portion of the first filling path 52 from the three-way valve 48 and the first filling path 52 discommunicates with the bypass path 54, and a state where the upstream portion and the downstream portion described above discommunicate with each other and the upstream portion communicates with the bypass path 54. The former state is an example of a communication state where the first filling path 52 and the second filling path 53 communicate with each other through the storage container 30 and not through the bypass path 54. The latter state is an example of a bypass state where the first filling path 52 and the second filling path 53 communicate with each other through the bypass path 54 and not through the storage container 30. The three-way valve may be provided between the second filling path 53 and the bypass path 54.

The controller 28c executes switching control to switch from the above communication state to the bypass state by the three-way valve 48 during filling of the hydrogen gas. The switching control is achieved by a switching controller functionally achieved by the CPU, the ROM, the RAM, and the memory of the controller 28c.

Figure 6:
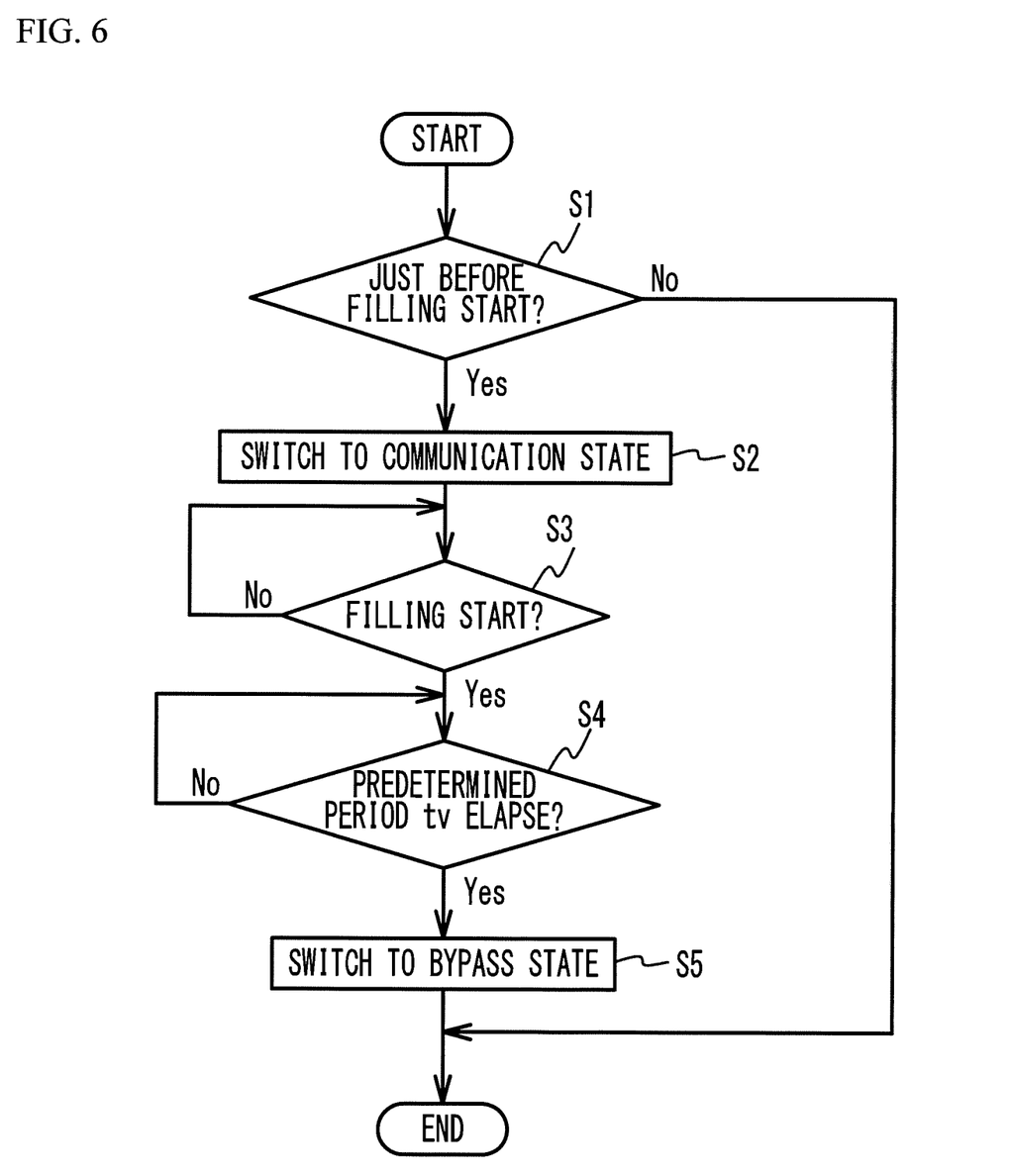
FIG. 6 is a flowchart illustrating an example of switching control.

FIG. 6 is a flowchart illustrating an example of the switching control. This switching control is repeatedly executed at predetermined intervals by the controller 28c. Firstly, it is determined whether or not the current state is just before the hydrogen gas starts being filled (step S1). Specifically, when a fuel cover of the lid box is opened, or when the communicators 15 and 26 are brought into a communicatable state, it is determined that the current state is just before the hydrogen gas starts being filled. When a negative determination is made in step S1, this control ends. When an affirmative determination is made in step S1, the three-way valve 48 switches from the bypass state to the communication state (step S2). In addition, the bypass state is maintained except during the filling of the hydrogen gas.

Next, it is determined whether or not the hydrogen gas starts being filled (step S3). Specifically, it is determined that the hydrogen gas starts being filled, when detecting at least one of, an increase in the pressure value in the second filling path 53 indicated by the pressure sensor 42, an increase in the flow rate of the hydrogen gas flowing through the second filling path 53 indicated by the flow rate sensor 43, and an increase in the temperature inside the tank 22 indicated by the temperature sensor 41. When a negative determination is made in step S3, the processing of step S3 is executed again. When an affirmative determination is made in step S3, it is determined whether or not a predetermined period tv elapses from when it is determined that the hydrogen gas starts being filled (step S4). The predetermined period tv is set to be shorter than a period from when the hydrogen gas starts being filled to when the filling is completed. When a negative determination is made in step S4, the processing of step S4 is executed again. When an affirmative determination is made in step S4, the three-way valve 48 switches from the above communication state to the bypass state (step S5), and the switching control ends. The processing of steps S2 to S5 is an example of processing executed by a switching controller configured to control the three-way valve 48 to be in the communication state until a predetermined period tv elapses from when the fuel gas starts being filled into the tank 22, and configured to control the three-way valve 48 to be in the bypass state until the filling of the fuel gas is completed after the predetermined period tv elapses.

Figure 7:
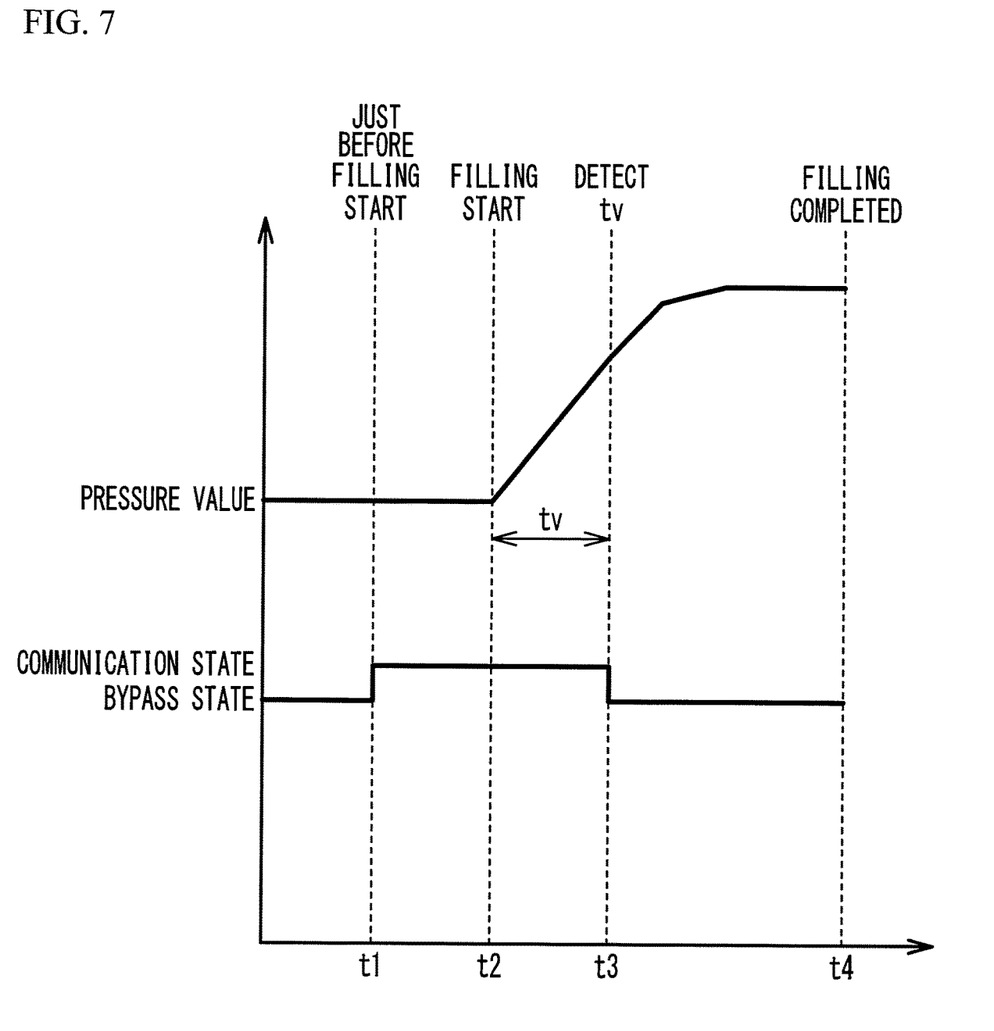
FIG. 7 is a timing chart illustrating an example of the switching control.

FIG. 7 is a timing chart illustrating an example of the switching control. FIG. 7 illustrates the pressure value in the second filling path 53 calculated based on the detection value of the pressure sensor 42, and the communication state or the bypass state. When it is determined that the current state is just before the filling starts at time t1, the three-way valve 48 switches from the bypass state to the communication state. When the start of filling is detected at time t2, the hydrogen gas is filled into the tank 22 through the storage container 30, and the pressure value steeply increases. This makes it possible to store foreign matter having been adhered to the nozzle 13 and the receptacle 25 in the storage container 30. Next, at time t3 after the predetermined period tv elapses from time t2, the communication state is switched to the bypass state. That is, the bypass state is switched before the filling is completed. Therefore, the hydrogen gas bypasses the storage container 30 and is filled into the tank 22. After that, an increasing rate of the pressure value gradually decreases. After the pressure value is substantially constant, and the filling of the hydrogen gas is completed at time t4.

In the above manner, the hydrogen gas is filled into the tank 22 through the storage container 30 in the early filling period, and the hydrogen gas is not filled into the tank 22 through the storage container 30 in the later filling period. In the early filling period, the foreign matter having been adhered to the nozzle 13 and the receptacle 25 can be stored in the storage container 30. Further, since the foreign matter having already been removed from the nozzle 13 and the receptacle 25 is stored in the storage container 30 and barely adheres to the valve mechanism 23 in the later filling period, the hydrogen gas bypasses the storage container 30 and is filled into the tank 22. Thus, in the later filling period, an increase in the pressure loss due to the flow of the hydrogen gas through the storage container 30 can be suppressed, which can also suppress an increase in the filling period due to the increase in the pressure loss of the hydrogen gas.

Figure 8:
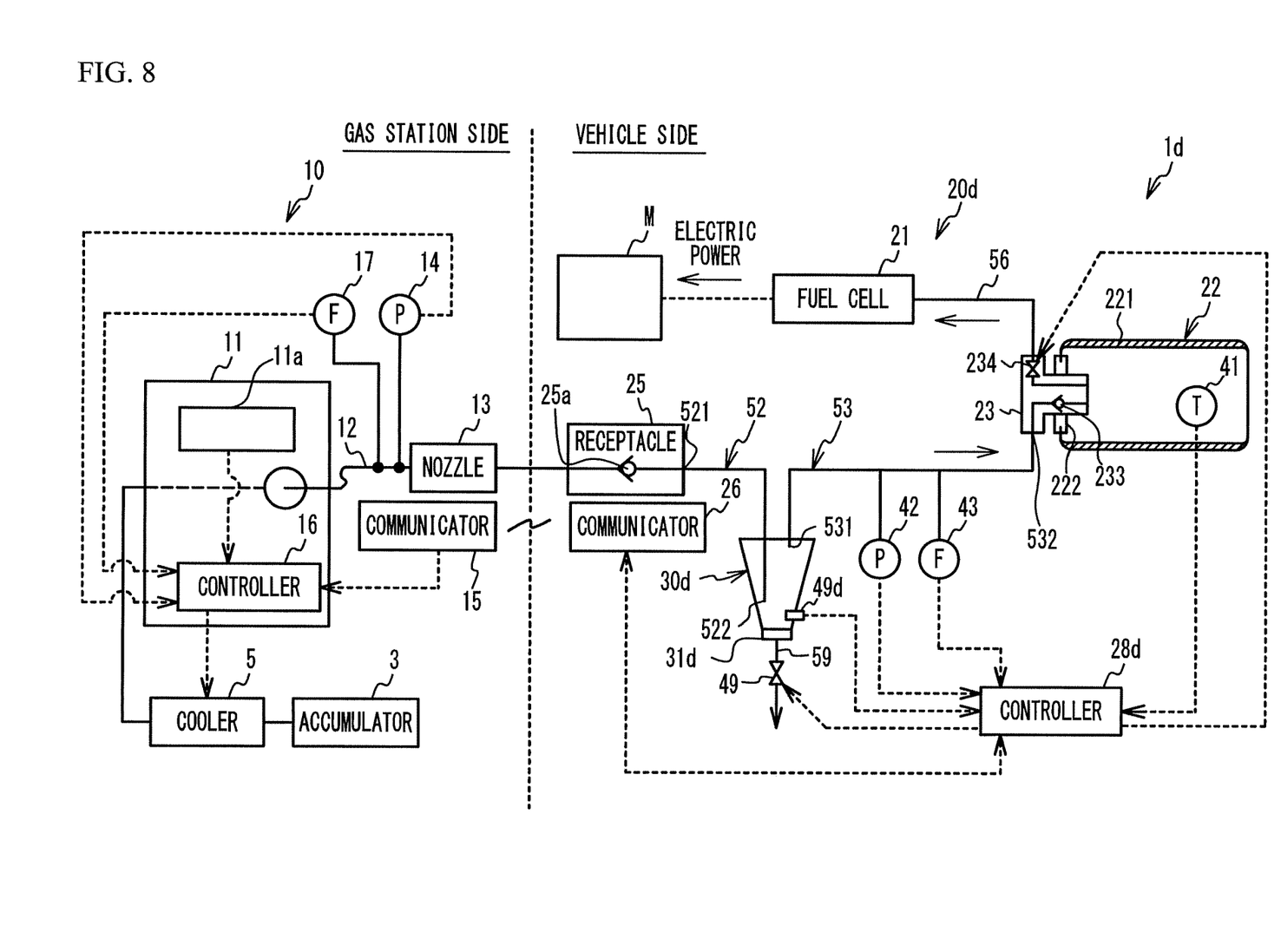
FIG. 8 is an explanatory view of a system according to a variation.

FIG. 8 is an explanatory view of a system 1d according to a variation. A bottom wall portion 31d of a storage container 30d in a vehicle 20d of the system 1d is not configured to open and close unlike the bottom wall portion 31 described above, but a discharge path 59 communicates with the bottom wall portion 31d. Further, a discharge valve 49 for opening and closing the discharge path 59 is provided. Furthermore, the storage container 30d is provided with a liquid level sensor 49d for detecting the amount of foreign matter stored in the storage container 30d. The discharge valve 49 and the liquid level sensor 49d are electrically connected with a controller 28d. Specifically, the liquid level sensor 49d is a liquid level sensor for detecting a height of the liquid level stored in the storage container 30d. The controller 28d executes discharging control to discharge foreign matter in the storage container 30d to the outside by opening the discharge valve 49 on the basis of the detection result of the liquid level sensor 49d. In addition, in opening the discharge valve 49, the opening degree of the discharge valve 49 is preferably adjusted so as to gradually discharge the foreign matter and the hydrogen gas, in order not to discharge a large amount of the foreign matter and a large amount of the hydrogen gas from the storage container 30 to the outside at once. The controller 28d is provided with a determinator and a discharge controller that are functionally achieved by the CPU, the ROM, the RAM, and the memory, which achieves the discharging control. The discharge path 59 and the discharge valve 49 are an example of a discharge mechanism discharging foreign matter stored in the storage container 30 to the outside. The discharge valve 49 is an example of an electrically controlled valve for opening and closing the discharge path 59. FIG. 8 illustrates a check valve 25a provided in the receptacle 25.

Figure 9:
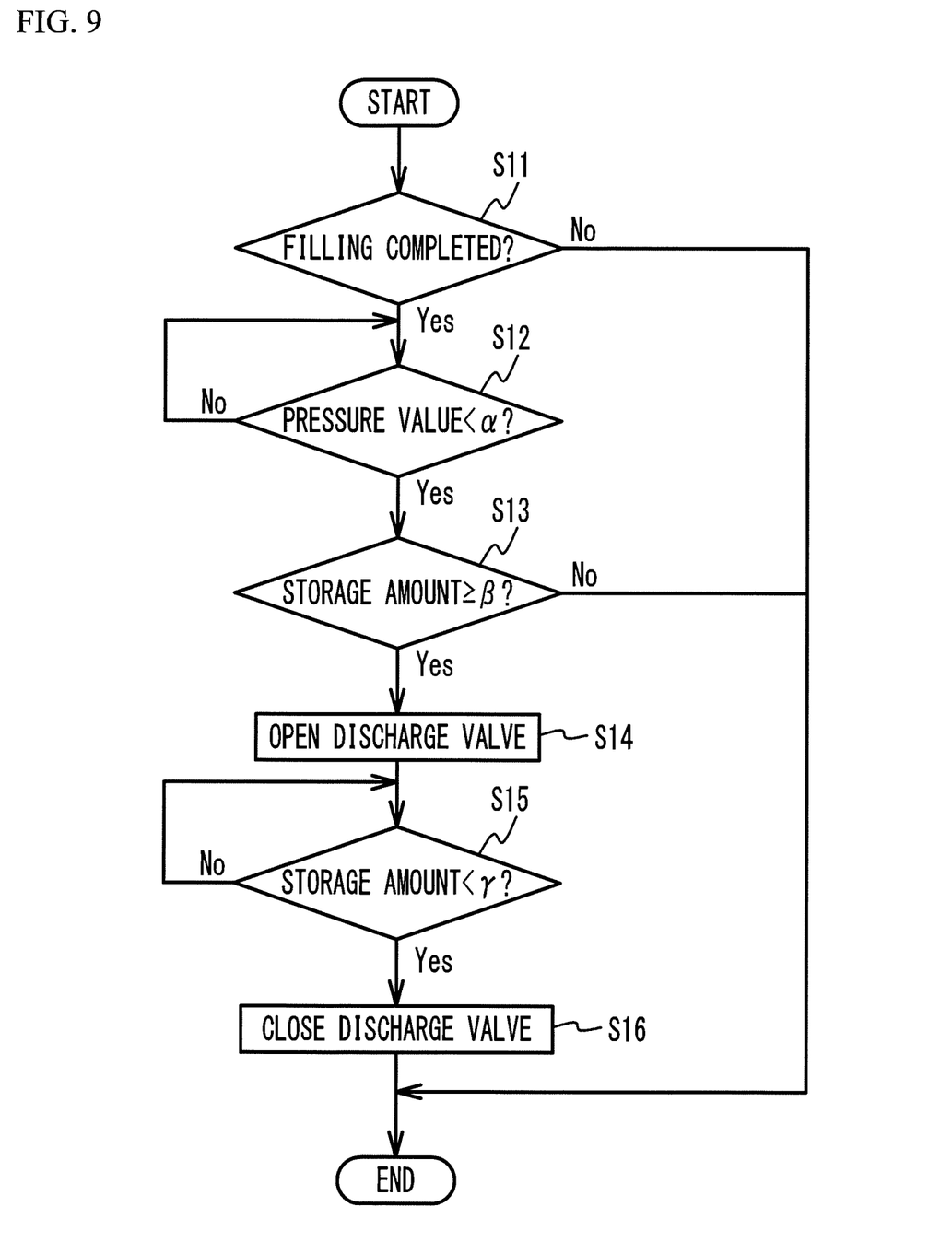
FIG. 9 is a flowchart illustrating an example of discharging control.

FIG. 9 is a flowchart illustrating an example of the discharging control. This discharging control is repeatedly executed by the controller 28d at predetermined intervals. Firstly, it is determined whether or not the filling of the hydrogen gas is completed (step S11). It is determined that the filling of the hydrogen gas is completed on the basis of, for example, at least one of a change rate of a pressure value indicated by the pressure sensor 42 falling within a predetermined range, a change rate of the flow rate indicated by the flow rate sensor 43 falling within a predetermined range, a change rate of the temperature indicated by the temperature sensor 41 falling within a predetermined range, closing of the fuel cover of the lid box, and a discommunicable state between the communicators 15 and 26. When a negative determination is made in step S11, this control ends.

When an affirmative determination is made in step S11, it is determined whether or not the pressure value in the second filling path 53 is smaller than a predetermined value α on the basis of the pressure sensor 42 (step S12). Since the receptacle 25 is provided with the check valve 25a as described above, when an affirmative determination is made in step S11, the first filling path 52, the second filling path 53, and the storage container 30d discommunicate with the outside, and the internal pressure of the second filling path 53 is substantially the same as the internal pressure of the storage container 30d. For this reason, the pressure sensor 42 is provided in the second filling path 53, but not limited thereto, and may be provided in the first filling path 52 or in the storage container 30d. When a negative determination is made in step S12, the processing of step S12 is executed again. The processing of step S12 is an example of processing executed by a determinator configured to determine whether or not the internal pressure of at least one of the first filling path 52, the second filling path 53, and the storage container 30d is lower than a predetermined value.

When an affirmative determination is made in step S12, it is determined whether or not the storage amount in the storage container 30d is equal to or larger than a predetermined value β on the basis of the liquid level sensor 49d (step S13). When a negative determination is made in step S13, this control ends. When an affirmative determination is made in step S13, the discharge valve 49 opens (step S14). Next, on the basis of the liquid level sensor 49d, it is determined whether or not the storage amount in the storage container 30d is smaller than a predetermined value γ (step S15). When a negative determination is made in step S15, the processing of step S15 is executed again. When an affirmative determination is made in step S15, the discharge valve 49 closes (step S16). The processing of steps S14 and S16 is an example of processing executed by the discharge controller configured to temporarily open the discharge valve 49 when it is determined that the internal pressure of the second filling path 53 is lower than a predetermined value.

Figure 10:
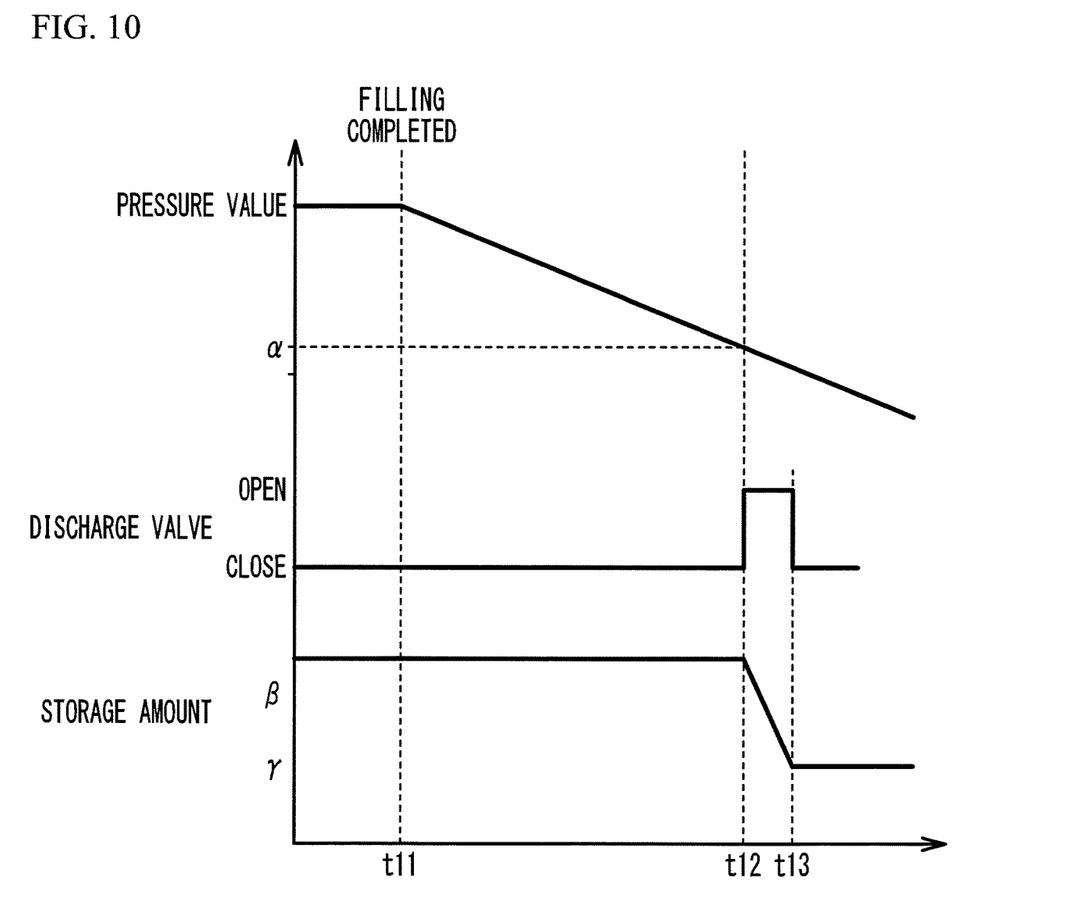
FIG. 10 is a timing chart illustrating an example of the discharging control.

FIG. 10 is a timing chart illustrating an example of the discharging control. FIG. 10 illustrates the pressure value in the second filling path 53 calculated based on the detection value of the pressure sensor 42, the opening state and closing state of the discharge valve 49, and a storage amount of foreign matter in the storage container 30d. When the storage amount is equal to or larger than a predetermined value β and the filling of the hydrogen gas is completed at time t11, the pressure values in the first filling path 52, in the second filling path 53, and in the storage container 30d gradually decrease in accordance with the driving of the fuel cell 21. The reason for this is as follows. The supply of the hydrogen gas from the tank 22 to the fuel cell 21 decreases the internal pressure of the tank 22, so that the internal pressure of the tank 22 is lower than that of the second filling path 53 by a predetermined value or more. This opens the check valve 233 of the valve mechanism 23 to introduce the hydrogen gas from the second filling path 53, the first filling path 52, and the storage container 30d into the tank 22, so that the internal pressure of the second filling path 53 decreases. When the pressure value is smaller than the predetermined value α at time t12, the discharge valve 49 opens to discharge the foreign matter in the storage container 30d to the outside. When the storage amount of the foreign matter in the storage container 30d is smaller than the predetermined value γ at time t13, the discharge valve 49 closes.

In the above manner, when the internal pressure of the second filling path 53 is lower than the predetermined value α, that is, when the internal pressure of the second filling path 53 is relatively low, the discharge valve 49 opens. For example, if the discharge valve 49 opens at the time when the internal pressure of the second filling path 53 is high, the hydrogen gas might be discharged together with the foreign matter. When the internal pressure of the second filling path 53 is relatively low, the discharge valve 49 opens to suppress the hydrogen gas from being discharged.

Although some embodiments of the present invention have been described in detail, the present invention is not limited to the specific embodiments but may be varied or changed within the scope of the present invention as claimed.

In the above embodiment and variations, the fuel cell vehicle on which the fuel cell 21 is mounted has been described as an example of a vehicle, but a vehicle to which the present invention can be applied is not limited thereto. For example, a vehicle may be any on which an internal combustion engine capable of burning with hydrogen gas or cooling fuel gas is mounted. In this case, a liquefied petroleum gas, a liquefied natural gas, a compressed natural gas, and the like in addition to hydrogen gas are used as a fuel gas to be filled in a tank. Any fuel gas is cooled to below freezing temperature, and then filled into the tank.

What is claimed is:

1. A device equipped with a tank, comprising:
   the tank to be filled with a fuel gas;
   a valve mechanism provided in the tank;
   a receptacle with which a nozzle of a fuel gas filling device is connectable;
   a first filling path, an upstream end of the first filling path communicating with the receptacle;
   a second filling path, a downstream end of the second filling path communicating with the tank through the valve mechanism; and
   a storage container hermetically communicating between a downstream end of the first filling path and an upstream end of the second filling path, and storing foreign matter contained in the fuel gas,
   wherein the storage container is positioned vertically above the downstream end of the first filling path.

2. The device equipped with the tank of claim 1, further comprising a discharge mechanism discharging the foreign matter stored in the storage container to an outside.

3. The device equipped with the tank of claim 2, wherein a length of the first filling path is smaller than that of the second filling path.

4. The device equipped with the tank of claim 3, wherein
   a direction of an axis of an opening of the downstream end of the first filling path intersects a vertical direction, and
   an angle, of a vertically upper side, between the direction of the axis of the opening of the downstream end of the first filling path and an inner surface of a wall portion of the storage container intersecting the axis is equal to or greater than 90 degrees and smaller than 180 degrees.

5. The device equipped with the tank of claim 2, wherein the discharge mechanism includes:
   a discharge path communicating with the storage container; and
   an electrically controlled valve opening and closing the discharge path,
   further comprising:
   a determinator configured to determine whether or not an internal pressure of at least one of the first filling path, the second filling path, and the storage container is lower than a predetermined value; and
   a discharge controller configured to temporarily open the electrically controlled valve when it is determined that the internal pressure is lower than the predetermined value.

6. The device equipped with the tank of claim 5, further comprising a pressure sensor detecting the internal pressure, wherein the determinator is configured to determine whether or not the internal pressure is lower than the predetermined value on a basis of a detection value of the pressure sensor.

7. The device equipped with the tank of claim 1, wherein an opening of the upstream end of the second filling path is directed in a horizontal direction or in a vertically upward direction with respect to the horizontal direction.

8. The device equipped with the tank of claim 1, wherein the storage container includes a blocking wall portion, and the blocking wall portion protrudes inward from an inner side surface of the storage container, is positioned vertically above a portion positioned in a most vertically lower side of the storage container, and is positioned vertically below the upstream end of the second filling path.

9. The device equipped with the tank of claim 1, further comprising:
   a bypass path bypassing the storage container and communicating with the first and second filling paths;
   a switching mechanism switching a communication state where the first and second filling paths communicate with each other through the storage container without going through the bypass path, and a bypass state where the first and second filling paths communicate with each other through the bypass path without going through the storage container; and
   a switching controller configured to control the switching mechanism to be in the communication state until a predetermined period elapses from when the fuel gas starts being filled into the tank, and configured to control the switching mechanism to be in the bypass state until filling of the fuel gas is completed after the predetermined period elapses.

10. The device equipped with the tank of claim 9, wherein the switching mechanism is a three-way valve provided between the first or the second filling path and the bypass path.

* * * * *